United States Patent [19]

Nilssen

[11] Patent Number: 4,729,081

[45] Date of Patent: Mar. 1, 1988

[54] POWER-FACTOR-CORRECTED AC/DC CONVERTER

[76] Inventor: Ole K. Nilssen, Caesar Dr., Rte. 5, Barrington, Ill. 60010

[21] Appl. No.: 936,455

[22] Filed: Dec. 1, 1986

[51] Int. Cl.[4] .......... H02M 3/335

[52] U.S. Cl. .......... 363/17; 363/48; 363/98; 363/126

[58] Field of Search .......... 363/17, 44–48, 363/98, 126, 132

[56] References Cited

U.S. PATENT DOCUMENTS

| | | | |
|---|---|---|---|
| 4,193,111 | 3/1980 | Wester | 363/126 X |
| 4,199,807 | 4/1980 | Crowe et al. | 363/132 |
| 4,263,642 | 4/1981 | Simmons et al. | 363/132 X |
| 4,340,931 | 7/1982 | Endo et al. | 363/126 X |

*Primary Examiner*—Peter S. Wong

[57] ABSTRACT

An AC/DC converter comprises a half-bridge electronic self-oscillating inverter powered from the non-filtered full-wave-rectified 120 Volt/60 Hz power line voltage, and its resulting amplitude-modulted 30 kHz output voltage is applied to a series-resonant L-C circuit. The 30 kHz voltage developing across the tank capacitor of this L-C circuit is rectified and applied as DC to an energy-storing capacitor, from which the AC/DC converter's output is supplied. Trigger pulses are provided to trigger the inverter into self-oscillation at the beginning of each pulse of DC voltage provided by the unfiltered rectified power line voltage. As soon as the magnitude of the DC voltage across the energy-storing capacitor exceeds a first level, the trigger pulses cease to be provided. As soon as the magnitude of the DC voltage on the energy-storing capacitor falls below a second level, the trigger pulses are again provided. As long as the inverter is in operation, the current pulled from the power line is essentially of constant magnitude and therefore providing for a power factor of about 90%.

23 Claims, 2 Drawing Figures

POWER-FACTOR-CORRECTED AC/DC CONVERTER

BACKGROUND OF THE INVENTION

1. Field of Invention

The present invention relates to AC-to-DC converters, particularly of a type providing relatively constant-magnitude DC voltage while at the same time drawing power from the AC source with a relatively high power factor.

2. Elements of Prior Art

To obtain a substantially constant-magnitude DC voltage from an ordinary 120 Volt/60 Hz AC source, it is only necessary to rectify and filter. However, the power factor associated with such a simple AC-to-DC conversion means is very low.

To improve the power factor by which power is drawn by the AC/DC conversion means, various schemes and arrangements are available. However, these usually involve the use of filter means comprising relatively large and heavy inductor means.

SUMMARY OF THE INVENTION

Objects of the Invention

An object of the present invention is that of providing an improved AC-to-DC converter means.

Another object is that of providing a means by which to obtain a substantially constant-magnitude DC voltage from an AC voltage source while at the same time drawing power from the AC voltage source with a relatively high power factor.

Yet another object is that of providing a cost-effective means of providing a relatively ripple-free DC voltage from an AC voltage source while drawing power from the AC voltage source with a relatively high power factor.

These are well as other objects, features and advantages of the present invention will become apparent from the following description and claims.

Brief Description

In its preferred embodiment, the AC/DC converter of the present invention comprises a half-bridge electronic self-oscillating inverter powered from the non-filtered full-wave-rectified 120 Volt/60 Hz power line voltage, and its resulting amplitude-modulated 30 kHz output voltage is applied to a series-resonant L-C circuit.

The 30 kHz voltage developing across the tank capacitor of this series-resonant L-C circuit is rectified and applied as DC to an energy-storing capacitor, from which the AC/DC converter's DC output voltage is supplied.

The self-oscillating half-bridge inverter is of such nature that is has to be triggered into self-oscillation. At the same time, the inverter is so arranged that it ceases to oscillate each time the magnitude of its DC supply voltage falls below a predetermined level.

Thus, with its DC supply voltage being a series of sinusoidally-shaped DC voltage pulses (which is what constitutes unfiltered full-wave-rectified 120 Volt/60 Hz voltage), it becomes necessary—if inverter oscillation is desired and since inverter oscillation necessarily ceases at the end of each DC voltage pulse—to trigger the inverter at the beginning of each of these DC voltage pulses.

Trigger pulses are controllably provided to trigger the inverter into self-oscillation at the beginning of each DC voltage pulse. However, as soon as the magnitude of the DC voltage across the energy-storing capacitor exceeds a first level, the trigger pulses cease to be provided. And, as soon as the magnitude of the DC voltage on the energy-storing capacitor falls below a second level, the trigger pulses are again provided.

Whenever the inverter is in operation, the current pulled from the power line is essentially of constant magnitude and therefore providing for a power factor of about 90%. Of course, when the inverter is not oscillating, no power is being pulled from the power line.

Thus, at maximum load, power to subject AC/DC converter is pulled from the power line continuously and at a high power factor. At below maximum load, the inverter cycles on and off in such manner as to keep the energy-storing capacitor fully charged; and power is then pulled from the power line at high power factor in intermittent spurts.

DESCRIPTION OF THE PREFERRED EMBODIMENT

Details of Construction

Figure 1:
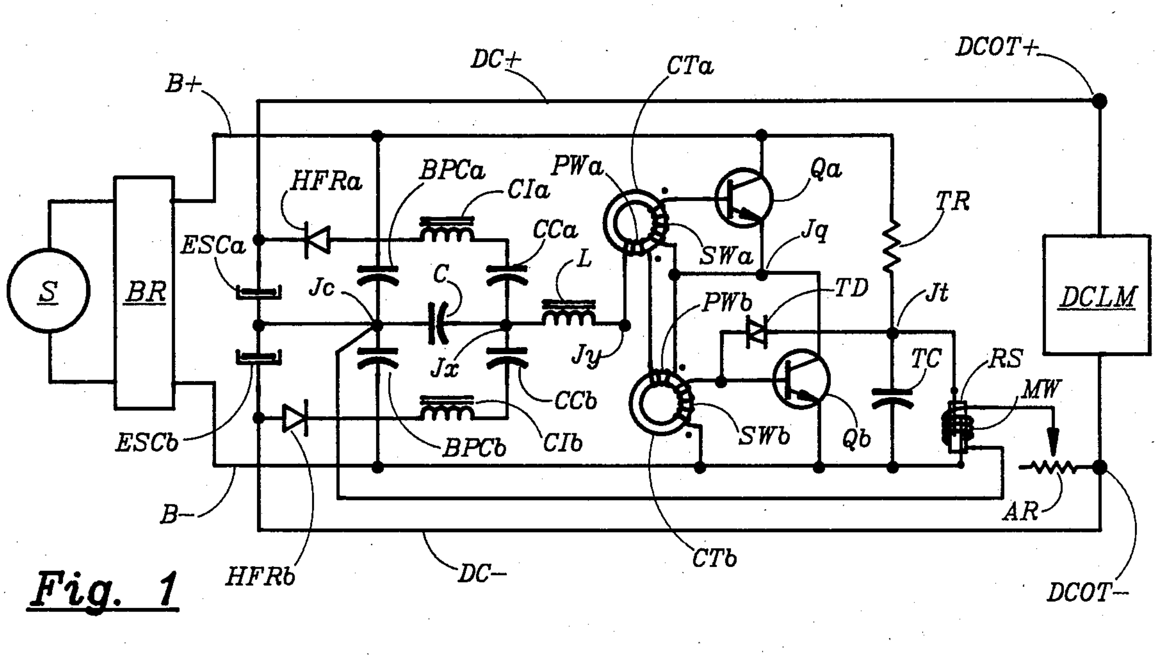
FIG. 1 illustrates the preferred embodiment of the AC/DC converter of the present invention.

In FIG. 1, a source S provides a 120 Volt/60 Hz voltage to a bridge rectifier BR, the DC output of which is applied between a B+ bus and a B− bus, with the B+ bus being of positive polarity.

A first high-frequency bypass capacitor BPCa is connected between the B+bus and a junction JC; and a second high-frequency bypass capacitor BPCb is connected between junction JC and the B− bus.

A first switching transistor Qa is connected with its collector to the B+ bus and with its emitter to a junction JQ; and a second switching transistor Qb is connected with its collector to junction JQ and with its emitter to the B− bus.

A tank capacitor C is connected between junction JC and a junction JX; a tank inductor L is connected between junction JX and a junction JY; and primary windings PWa and PWb of positive feedback saturable current transformers CTa and CTb, respectively, are connected in series between junction JY and junction JQ.

Secondary winding SWa of transformer CTa is connected between the base and emitter of transistor Qa; and secondary winding SWb of transformer CTb is connected between the base and the emitter of transistor Qb.

A first energy-storing capacitor ESCa is connected between junction JC and a positive DC bus DC+; and a second energy-storing capacitor ESCb is connected between junction JC and a negative DC bus DC−.

A first charging capacitor CCa is connected in series with a first charging inductor CIa to form a first series-combination, and this first series-combination is connected between junction JX and the anode of a first high frequency rectifier HFRa. The cathode of rectifier HFRa is connected with the DC+ bus.

A second charging capacitor CCb is connected in series with a second charging inductor CIb to form a second series-combination, and this second series-combination is connected between junction JX and the cathode of a second high frequency rectifier HFRb. The anode of rectifier HFRb is connected with the DC− bus.

A trigger resistor TR is connected between the B+bus and a junction JT; and a trigger capacitor TC is connected between junction JT and the B− bus. A trigger Diac TD is connected between junction JT and the base of transistor Qb.

The contacter terminals of a magnetic reed switch RS are connected across trigger capacitor TC, which is to say: between junction JT and the B− bus. Around the reed switch is placed a magnetizing winding MW, the terminals of which are connected in series with an adjustable resistor AR to form a series-combination, and this series-combination is connected between junction JC and the DC− bus.

A DC load means DCLM is connected across DC output terminals DCOT+ and DCOT−; which DC output terminals are connected with the DC+ bus and the DC− bus, respectively.

DETAILS OF OPERATION

Figure 2:
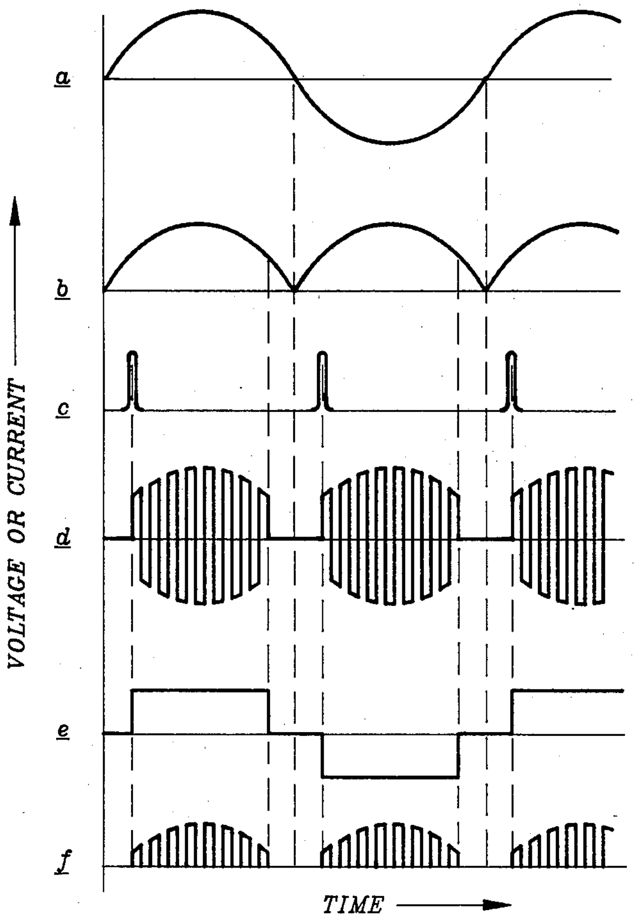
FIG. 2 illustrates various voltage and current waveforms associated with the preferred embodiment of the AC/DC converter.

The detailed operation of the circuit of FIG. 1 may best be understood with reference to the various waveforms of FIG. 2, wherein:

FIG. 2*a* shows the waveform of the 120 Volt/60 Hz AC voltage provided from source S;

FIG. 2*b* shows the waveform of the full-wave-rectified 120 Volt/60 Hz AC voltage;

FIG. 2*c* shows the trigger pulses provided to the base of transistor Qb;

FIG. 2*d* shows the waveform of the high-frequency voltage provided between junctions JY and JC when the inverter is oscillating;

FIG. 2*e* shows the waveform of the current drawn from the 120 Volt/60 Hz AC voltage source S; and FIG. 2*f* shows the waveform of the charging current provided to one of the energy-storing capacitors ESCa/ESCb.

The circuit arrangement of FIG. 1 comprises a half-bridge inverter; which half-bridge inverter consists principally of the following components: bypass capacitors BPCa/BPCb, transistors Qa/Qb, and positive feedback current transformers CTa/CTb. The operation of such a self-oscillating half-bridge inverter is well known and is described in various ways in U.S. Pat. Nos. Re. 31,758, 4,506,318 and 4,581,562 to Nilssen.

The output of this half-bridge inverter is provided between junctions JC and JY and is illustrated in FIG. 2*d* as being an amplitude-modulated high-frequency voltage. Connected with the inverter's output, between junctions JC and JY, is a series-tuned L-C circuit consisting of tank inductor L and tank capacitor C. This series-tuned L-C circuit is series-resonant at or near the fundamental frequency of the inverter's amplitude-modulated high-frequency output voltage; which fundamental frequency is on the order of 30 kHz.

In the preferred embodiment, as long as indeed provided, the trigger pulses occur at a point approximately 30 degrees after the beginning of each sinusoidally-shaped DC supply voltage pulse (see FIGS. 2*b*/2*c*). Moreover, the inverter is arranged to cease oscillation whenever the instantaneous magnitude of its DC supply voltage falls below the level associated with a point just a little less than 30 degrees before the end of each sinusoidally-shaped DC supply voltage pulse. The resulting inverter output voltage will then be as illustrated in FIG. 2*d;* which results in a current draw from the AC voltage source (S) as illustrated in FIG. 2*e* and in a charging current provided to energy-storing capacitors ESC1/ESC2 as illustrated in FIG. 2*f.*

More particularly, being excited by the intermittent amplitude-modulated 30 kHz squarewave voltage of FIG. 2*d*, and being series-resonant at or near the 30 kHz fundamental frequency of this squarewave voltage, the voltage developed across the tank capacitor (C) will (by way of so-called Q-multiplication) increase in magnitude until it gets limited by loading; which means that it will increase to the point of providing substantial charging current to energy-storing capacitors ESCa and ESCb.

In turn, as long as the inverter operates to produce the output voltage indicated by FIG. 2*d*, the magnitude of the DC voltage developing across energy-storing capacitors ESCa and ESCb will increase (in a step-wise manner) until one or the other of the following events occur:

(i) the current drain caused by DC load means DCLM equals the average charging current being provided from the inverter's output by way of the series-resonant L-C circuit;

(ii) the magnitude of the voltage across energy-storing capacitor ESCb gets to be so high as to cause enough current to pass through magnetizing winding MW to cause reed switch RS to close, thereby causing the inverter to stop operation.

Thus, as long as the AC/DC converter of FIG. 1 is loaded at or beyond a certain level (by DC load means DCLM), the magnitude of the DC output voltage (which exists between DC output terminals DCOT+ and DCOT−) is either at or below a certain predetermined magnitude (which is determined by the setting of adjustable resistor AR), and the inverter then operates in the intermittently continuous manner shown in FIG. 2*d.*

On the other hand, if the AC/DC converter is loaded below said certain level, the magnitude of the DC output voltage will gradually increase until it exceeds the predetermined level. At that point the reed switch closes and the inverter ceases operation, thereby ceasing altogether to provide output.

Thereafter, the magnitude of the DC output voltage will gradually decrease until the amount of current flowing through magnetizing winding MW gets to be so low as to cause reed switch RS to open, thereby to cause the inverter to start operating again, thereby to cause the magnitude of the DC output voltage to start increasing again in a gradual step-wise manner.

In other words, when loaded to or beyond a certain point, the inverter in the AC/DC converter will continuously operate in the (120 Hz) interrupted manner indicated by FIG. 2*d;* whereas, when loaded below that certain point, the inverter will *interruptedly* operate in the interrupted manner indicated by FIG. 2*d* (i.e., operating in a doubly interrupted manner).

While the rate of interruption of the inverter's output voltage is a constant 120 Hz, the rate at which this constant 120 Hz interruption is interrupted is dependent upon the degree of loading applied to DC output terminals DCOT1/DCOT2 as well as the degree of hysteresis built into the magnetic reed switch: the less hysteresis, the higher the rate of interruption; the less loading, the lower the rate of interruption.

ADDITIONAL COMMENTS (a) The basic nature of a series-excited parallel-loaded high-Q resonant L-C circuit, when excited by a series-connected voltage source, is that of essentially constituting a current source to its parallel-connected load. Moreover, the magnitude of the current provided to the parallel-connected load is substantially proportional to the magnitude of the voltage provided by the series-connected voltage source.

Moreover, when such an L-C circuit is parallel-loaded with a substantially constant-voltage load (such as in instant case), the loading provided by the L-C circuit to the series-connected voltage source is substantially a constant-current. That is: a parallel-connected *constant-magnitude-voltage* load converts into a *constant-magnitude-current* load as seen from the viewpoint of a series-connected source.

(b) One result of the above-described basic nature of a high-Q series-excited parallel-loaded resonant L-C circuit is that the magnitude of the charging current provided to the energy-stored capacitors ESC1/ESC2 (see FIG. *2f*) is roughly proportional to the magnitude of the inverter output voltage (see FIG. *2d*), which in turn in proportional to the magnitude of the inverter's DC supply voltage (see FIG. *2b*).

(c) Another result is that the magnitude of the current drawn by the inverter from its DC voltage supply will be about proportional to the magnitude of the DC voltage present across the energy-storing capacitors.

(d) Yet another result is that the magnitude of the current drawn by the series-resonant L-C circuit when powering a constant-voltage parallel-connected load, is substantially constant.

Thus, since—for a given setting of the adjustable resistor (AR)—the magnitude of the voltage on the energy-storing capacitors is substantially constant, the magnitude of the *current* provided by the inverter into the series-tuned L-C circuit is approximately constant; which, in turn, means that the magnitude of the current drawn by the inverter from its DC supply voltage will be approximately constant—as indicated in FIG. *2e*.

(e) By virtue of their basic nature, magnetic reed switches have hysteresis. Thus, the magnitude of the current through the magnetizing winding (MW) required for causing the reed switch (RS) to close is higher than the magnitude of the current required to cause it to open.

Within a wide range, the amount of hysteresis can be designed to be just about any degree required. In the preferred embodiment, the hysteresis is about 20%; which implies that the magnitude of the DC output voltage will be regulated to within about plus/minus 10%.

(f) By changing the setting of the adjustable resistor (AR), the magnitude of the DC output voltage can likewise be set.

In this connection, it is important to note that the magnitude of the DC output voltage can be set to virtually any level: higher or lower than the peak magnitude of the DC supply voltage, higher or lower than the peak magnitude of the inverter's output voltage, etc.

(g) In the preferred embodiment, the inverter is so arranged as to oscillate approximately only in the intervals between 30 and 120 degrees, as well as between 210 and 330 degrees, of the 120 Volt/60 Hz supply voltage. As a result, current is drawn from the source only during those intervals; the implication of which is to minimize the third harmonic content of the current drawn from the source, which feature is important in situations where power is provided by a single phase of a three-phase power distribution system—a situation that is frequently significant in connection with powering fluorescent lighting systems.

(h) The current drawn from the power line by the circuit of FIG. 1 is illustrated by FIG. *2e* in an idealized form, which would only occur if using perfect components, including an infinitely high Q of the L-C tuned circuit.

With such perfect components—as long as the conduction angle of the current approximately covers the indicated two thirds of the total period of the power line voltage (i.e., the middle 120 degrees out of each half-cycle)—the power factor of the power drawn from the power line would be about 85%.

However, in reality, the current waveshape will not have quite as flat a top as is shown in FIG. *2e*. Rather, the waveshape will exhibit a slightly curved top—with a raised center. As a result, the power factor of the power actually drawn from the power line will be closer to about 90%.

(i) In FIG. 1, the principal purpose of elements CCa/CCb is that of providing DC isolation between junction JX and energy-storing capacitors ESCa/ESCb, and the principal purpose of elements CIa/CIb is that of improving rectification efficiency by way of mitigating the effect of the reverse recovery time of rectifiers HFRa/HFRb.

(j) In overall operation, the circuit of FIG. 1 functions in such manner as to convert the unfiltered full-wave-rectified 120 Volt/60 Hz voltage (which is provided to the half-bridge inverter as a pulsed DC voltage source having near-negligible internal impedance) (see FIG. *2b*) to a 30 kHz squarewave AC voltage provided at the inverter's output terminals JC and JY (see FIG. *2d*). The internal source impedance associated with the inverter's output is also of near-negligible magnitude; which is to say that the inverter's DC supply voltage as well as the inverter's squarewave output voltage both constitute nearly perfect *voltage* sources.

On the other hand, by virtue of the action of the series-resonant L-C circuit, the AC output provided between output terminals JC and JX constitutes a near-perfect current source; which, of course, is equivalent to saying that the DC charging current provided to the two energy-storing capacitors (ESCa/ESCb) is provided from a near-perfect *current* source.

(k) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

What is claimed is:

1. The combination comprising:

first means operable to connect with a relatively low frequency voltage, such as the voltage on an ordinary electric utility power line and, when so connected, conditionally operative to provide a relatively high frequency AC voltage at an AC output, the first means having control means operative, during any period when receiving a control action, to prevent the first means from providing the relatively high frequency AC voltage;

second means connected in circuit between the AC output and a DC output, the second means being operative to provide a unidirectional current to an energy-storing capacitor means connected with the DC output, a DC voltage being thereby provided at this DC output; and third means connected between the DC output and the control means and operative to provide said control action whenever the magnitude of the DC voltage exceeds a predetermined level.

2. The arrangement of claim 1 wheren the second means is further characterized by being operative to cause the magnitude of the unidirectional current to be approximately proportional to the magnitude of the AC voltage, substantially irrespective of the magnitude of the DC voltage.

3. The arrangement of claim 1 wherein the first means comprises: (i) rectifier means operative to connect with the power line and then to provide a unidirectional voltage having an instantaneous absolute magnitude approximately equal to that of the relatively low frequency voltage, and ii) inverter means connected with this unidirectional voltage and operative to provide said relatively high frequency AC voltage.

4. The arrangement of claim 1 wherein, whenever the relatively high frequency AC voltage is being provided at the AC output, its instantaneous absolute magnitude is substantially proportional to that of the relatively low frequency voltage on the power line.

5. The arrangement of claim 1 wherein said relatively high frequency AC voltage is characterized by being interrupted with periods of zero magnitude at a frequency twice that of the relatively low frequency voltage on the power line.

6. A combination comprising:

a first means operable to connect with a relatively low frequency voltage, such as the voltage on an ordinary electric utility power line, and to provide a relatively high frequency AC voltage at a pair of AC output terminals, the relatively high frequency AC voltage being interrupted with periods of essentially zero magnitude, the instantaneous absolute magnitude of the relatively high frequency AC voltage being substantially proportional to that of the relatively low frequency voltage except during the periods of essentially zero magnitude; and a second means connected with the AC output terminals and operative to provide a DC voltage at a pair of DC terminals, the magnitude of the DC voltage being substantially constant over at least the duration of a complete period of the relative low frequency voltage.

7. The combination of claim 6 wherein the first means draws current from the power line during more than half of the duration of each period of the relatively low frequency voltage.

8. The combination of claim 7 wherein the first means draws current from the power line during approximately two thirds of the duration of each period of the relatively low frequency voltage.

9. The combination of claim 7 wherein the magnitude of the current drawn from the power line is approximately constant during any time when current is indeed being drawn from the power line.

10. The combination of claim 6 to which a load means is connected with the DC terminals, the load means being operative to draw a substantially continuous unidirectional current from the DC terminals.

11. The combination of claim 5 wherein each of said periods of essentially zero magnitude is shorter in duration than half of a complete half-cycle of the relatively low frequency voltage.

12. The combination of claim 11 wherein each of said periods is of duration about equal to one third of said complete half-cycle.

13. An arrangement comprising:

rectifier means connected with the power line voltage from an ordinary electric utility power line and operative to provide at a first DC output a first DC voltage having an instantaneous absolute magnitude approximately equal to that of the power line voltage;

inverter means connected with the first DC output and operative to provide an AC voltage at an AC output, the frequency of the AC voltage being substantially higher than that of the power line voltage, the instantaneous absolute magnitude of the AC voltage being substantially proportional to that of the power line voltage; and conversion means connected with the AC output and operative to provide a second DC voltage at a second DC output, the magnitude of the second DC voltage being substantially constant, the magnitude of the current drawn by the conversion means from the AC output being substantially independent of the magnitude of the AC voltage;

whereby the magnitude of the current drawn by the rectifier means from the power line is substantially constant for as long as current is being provided to the conversion means from the AC output.

14. An arrangement comprising:

first means conditionally operative to provide a periodically intermittent AC voltage at an AC output, the first means having prevent means operative in response to a control action to prevent the provision of the periodically intermittent AC voltage;

second means connected with the AC output and operative to provide a DC voltage at a DC output, an energy-storing means being connected in circuit with the DC output; and third means connected in circuit between the DC output and the control means, the third means being responsive to the magnitude of the DC voltage and operative, whenever the magnitude of the DC voltage exceeds a first predetermined level, to provide said control action.

15. The arrangement of claim 14 wherein the third means is operative, whenever the magnitude of the DC voltage decreases below a second predetermined level, to cease providing said control action.

16. An arrangement comprising:

first means operable to connect with the power line voltage on an ordinary electric utility power line and operative, when so connected, to provide a first DC voltage at a first DC output, the output impedance of the first DC output being relatively low, the instantaneous absolute magnitude of the first DC voltage being about the same as that of the power line voltage;

second means connected with the DC output and operative to provide an AC voltage at an AC output, the output impedance of the AC output being relatively low, the AC voltage being: i) of instantaneous absolute magnitude substantially proportional to that of the first DC voltage, and ii) of frequency substantially higher than that of the power line voltage;

third means connected with the AC output and operative to provide a unidirectional current at a second DC output, the output impedance of the second DC output being relatively high; and energy-storing capacitor means connected with the second DC output and operative to receive the unidirectional current provided therefrom, thereby to develop a second DC voltage of a DC terminal means, the magnitude of the second DC voltage being substantially constant for the duration of a complete cycle of the power line voltage, the DC terminal means being operative to connect with a DC load means.

17. The arrangement of claim 16 wherein the third means includes a series-tuned L-C circuit having a tank capacitor and a tank inductor connected in series, this series-tune L-C circuit being: (i) connected across the AC output, and (ii) series-resonant at or near the fundamental frequency of the AC voltage.

18. The arrangement of claim 17 wherein the third means also includes rectifier means connected in circuit between the tank capacitor and the second DC output, thereby providing for the series-tuned L-C circuit to be series-excited and parallel-loaded.

19. The arrangement of claim 16 including adjustment means connected in circuit between the energy-storing capacitor means and the second means, the adjustment means being operative to permit adjustment of the magnitude of the second DC voltage.

20. The arrangement comprising:

a source of DC voltage;

inverter means connected with the source of DC voltage and conditionally operative to provide a squarewave voltage at an inverter output, the inverter means having control input means operative in response to a control input to remove the squarewave voltage from the inverter output, the squarewave voltage having a fundamental frequency;

a series-combination of an inductor and a capacitor connected across the inverter output, the series-combination being resonant at or near the funamental frequency;

rectification means connected in parallel circuit with the capacitor and operative to supply a unidirectional current at a pair of DC current terminals; and filter means connected with the DC current terminals and operative to provide a filtered DC voltage at a pair of DC voltage terminals.

21. The arrangement of claim 20 additionally comprising voltage sensing means connected in circuit with the DC voltage terminals as well as with the control input means, and operative in response to the magnitude of the filtered DC voltage to supply the control input whenever the magnitude of the filtered DC voltage exceeds a first predetermined level.

22. The arrangement of claim 21 with means whereby the voltage sensing means ceases to supply the control input whenever the magnitude of the filtered DC voltage ceases to exceed a second predetermined level, which second predetermined level is lower than the first predetermined level.

23. The arrangement of claim 20 wherein the instantaneous absolute magnitude of the DC voltage is approximately equal to that of a sinusoidal AC voltage, such as a power line voltage.

* * * * *